United States Patent [19]
Calvin

[11] Patent Number: 4,562,870
[45] Date of Patent: Jan. 7, 1986

[54] DUBBING TWISTER DEVICE

[76] Inventor: Larry Calvin, P.O. Box 1706, Bozeman, Mont. 59715

[21] Appl. No.: 605,265

[22] Filed: Apr. 30, 1984

[51] Int. Cl.⁴ .............................................. B21F 7/00
[52] U.S. Cl. ........................................ 140/149; 57/24
[58] Field of Search ...................... 140/102.5, 149, 118, 140/120, 123, 123.5; 43/4, 1, 4.5, 42.53; 57/6, 5, 4, 24; 269/257, 289 R, 271–275, 901, 302.1; 300/19

[56] References Cited
U.S. PATENT DOCUMENTS

| | | | |
|---|---|---|---|
| 3,028,720 | 4/1962 | Houk | 140/149 |
| 4,292,797 | 10/1981 | Auger | 57/24 |
| 4,481,759 | 11/1984 | Venot | 57/5 |

Primary Examiner—Lowell A. Larson
Attorney, Agent, or Firm—Richard C. Conover

[57] ABSTRACT

An improved tool for making dubbed bodies used in fly tying. This tool includes a thread twisting means releasably mounted on a base which means is used for twisting a loop of thread having dubbing material sandwiched in the loop. The thread twisting means can be released from the base and used as a tool for wrapping the dubbed thread on the body of the fly being tied. Further the gripping devices which hold the thread during the twisting process have multiple devices for holding the thread, the devices located one above the other. By selecting one of the devices the distance of the thread loop above the top surface of the base can be selected so that the taper of the dubbed thread can be selected easily.

5 Claims, 4 Drawing Figures

DUBBING TWISTER DEVICE

BACKGROUND OF THE INVENTION

This invention relates to a tool for making dubbed bodies used in fly tying. It is well known that dubbed bodies may be used when tying a fly on a hook secured in a vice. Fly tying thread held by a bobbin is used to tie materials on the hook. When it is desired to make a dubbed body, the bobbin is allowed to extend down from the hook secured in the vice. Dubbing material is then placed on one side of the thread. This is a difficult procedure because the thread twists as it hangs down from the hook and it is difficult to keep the dubbing material on one side of the thread during this process. When the dubbing material is so positioned the thread from the bobbin is looped around a finger of one hand, for example, and drawn over the dubbing material and then wrapped on the hook to form a loop of thread with the dubbing material positioned within the loop. The loop is then twisted to form a dubbed thread which is then wrapped on the hook to form a dubbed body.

This process of making dubbed bodies has several problems. One of these problems is that described above which is the difficulty of positioning the dubbing material on one side of the thread before the loop is formed. Another problem is that of making tapered bodies. When tapered bodies are to be made using the process described above more dubbing material is added where body is to be larger. In actual practice this is difficult to control when the dubbed body is made in the conventional manner as described above.

To overcome some of these problems a fairly recent device called "The Dubber" has come on the market and is now being manufactured by the Multus Company of Medfield, Mass. This device includes a box on the top of which is mounted a spindle. One end of the spindle has a post for holding a loop of thread. The other end of the spindle is mounted to a crank. A clip is also mounted on top of the box in spaced apart relation from the post mounted to the spindle. With this device a length of thread is laid on the box between the clip and the post mounted to the spindle. Dubbing material is laid down over the thread and then the free end of the thread adjacent to the post is laid down over the dubbing material and secured to the clip holding the other end of the thread. The crank is then turned to form a dubbed thread. The dubbed thread is then lifted away from the clip holding the ends of the thread and the post around which the loop is formed. This dubbed thread may then be tied on to a hook in a conventional manner.

SUMMARY OF INVENTION

The present invention is an improved tool for making dubbed bodies used in fly tying. This invention overcomes the difficulty of positioning dubbing material on one side of the thread. With this tool tapered bodies are easily made. Further, the handle used to twist the loop of thread which holds the dubbed material can be easily used as a tool to wrap the dubbed thread on the hook of the fly being tied.

The improved tool for making dubbed bodies includes an elongate base to which is attached a thread twisting means. This thread twisting means includes a portion for holding a loop of thread and further having a second portion connected to a cylindrical handle for twisting the loop of thread. The thread twisting means is releasably held to the base so that it can be removed from the base when a dubbed thread has been formed. This thread twisting means can then be used as a tool for wrapping the dubbed thread on the body of the fly being tied. A gripping means is located at the end of the base opposite to that of the thread twisting means for holding the other end of the loop. This gripping means is provided with multiple devices for holding the thread, the devices located one above the other. By selecting one of the devices the distance of the thread loop above the top surface of the base at the location of the gripping means can be selected. In this manner the taper of the dubbed thread can be selected easily. A body with larger taper can be formed by selecting one of the gripping positions further away from the base.

In one embodiment of the present invention a rough surface is provided on the top of the base to hold the dubbing material in place when it is laid on the thread on the base.

The taper of the thread in relation to the top surface of the box determines the taper of the body. This results because the dubbing material is drawn across the top surface of the base and the larger the distance between the thread and top surface the thicker the dubbed body which results.

BRIEF DESCRIPTION OF THE DRAWINGS

In order that the invention may be clearly understood and readily carried into effect a preferred embodiment will now be described, by way of example only, with reference to the accompanying drawings wherein.

DESCRIPTION OF A PREFERRED EMBODIMENT

Figure 1:
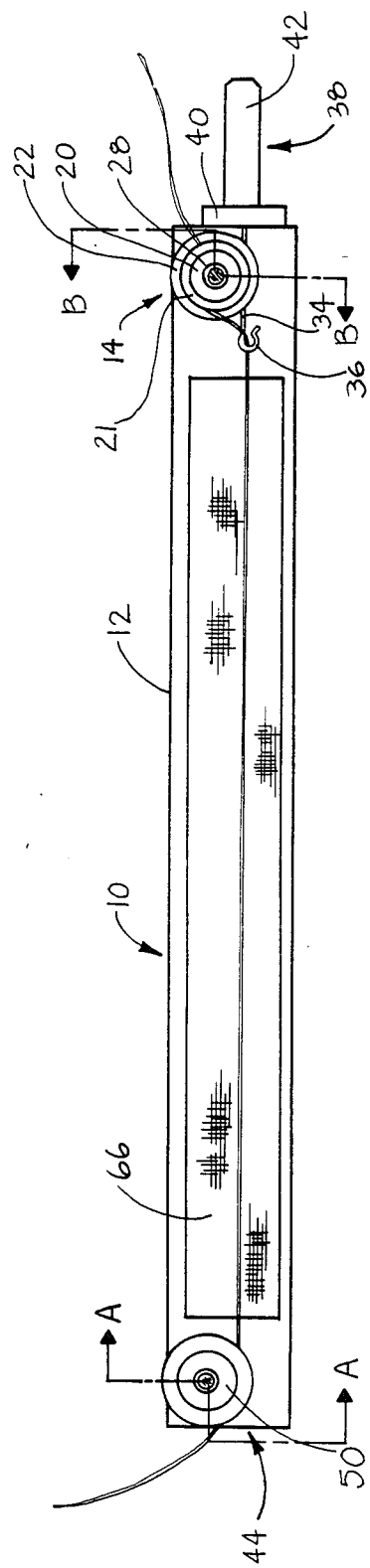
FIG. 1 is a top view of the device for making dubbed bodies according to the present invention with thread shown before dubbing material is laid down.
Figure 2:
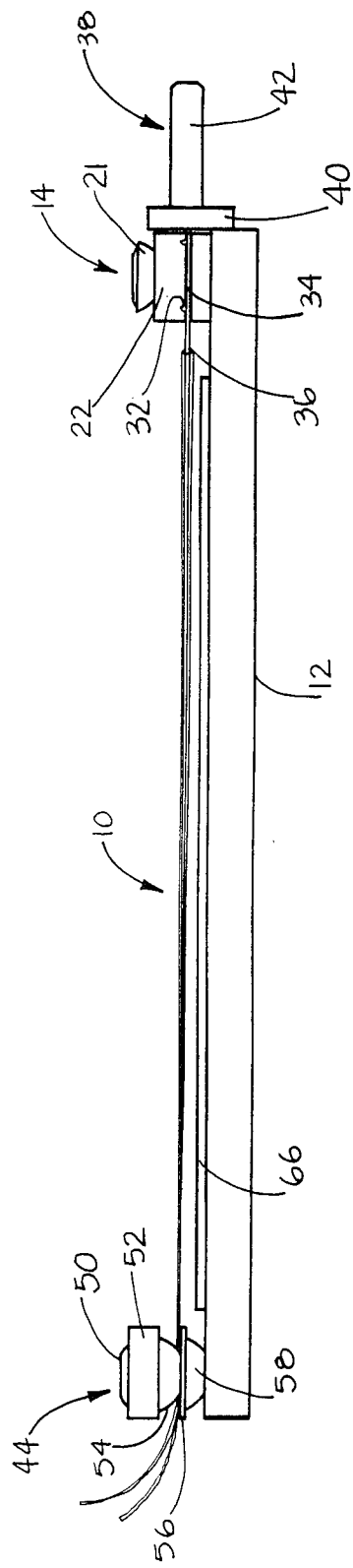
FIG. 2 is an elevational view of the device shown in FIG. 1 with the thread positioned to form an untapered dubbed thread.
Figure 3:
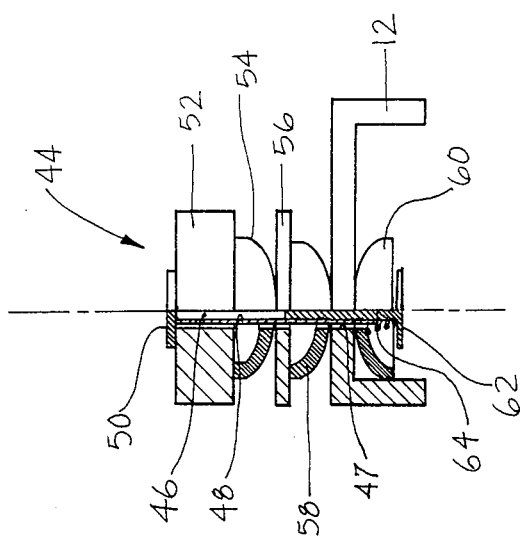
FIG. 3 is a cross-sectional view of the device shown in FIG. 1 along line A—A.

The dubbed body tool 10 is shown in FIGS. 1 and 2. This tool includes an elongate base 12 which in a preferred embodiment is formed of a channel piece as shown in FIGS. 3 and 4.

An assembly 14 is mounted to the base 12 at one end thereof as shown in FIG. 2. As shown in FIG. 4 the assembly 14 includes a post 15 having a head 20. The post 15 is inserted in bore 18 formed in the base 12 as shown in FIG. 4. A cup washer 21 is mounted on post 15 below head portion 20 as shown in FIG. 4. Two spacer elements 22 and 24 each having a central bore are mounted on post 15 as shown in FIG. 4. A machine screw 28 is threaded into threaded bore 16 of post 15. A spring 30 is mounted in surrounding relation with screw 28 and post 15 as shown in FIG. 4 and is secured in place by the head of machine screw 28. A cup washer 26 is mounted on post 15 above the head of machine screw 28. The spring 30 acts to resiliently clamp the cup washer 21, the spacer elements 22 and 24 and the cup washer 26 to the base 12.

A notch 32 is provided in spacer 22. This notch 32 is a straight line which coincides with a chord of the circular spacer 22.

Figure 4:
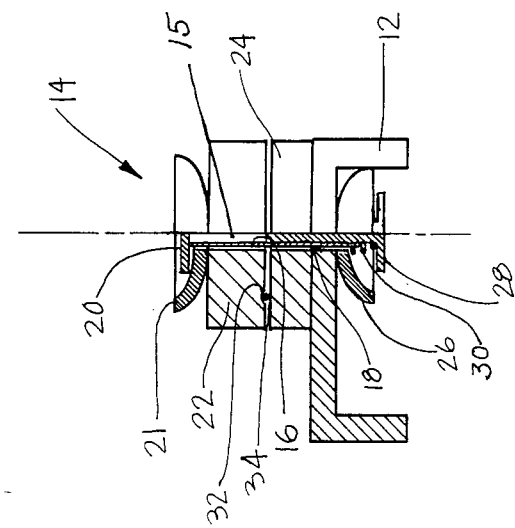
FIG. 4 is a cross-sectional view of the device shown in FIG. 1 along line B—B.

A wire spindle 34 is positioned in the notch 32 as shown in FIGS. 2 and 4. The spindle 34 has a hook 36 attached to one end of the spindle as shown in FIGS. 1 and 2.

The other end of the spindle 34 is attached to a handle 38. The handle 38 includes a disc 40 and a cylinder 42 mounted in perpendicular relation to the disc 40 as shown in FIGS. 1 and 2. The disc 40 aids to stabilize the location of the spindle 34 in notch 32 and the cylinder 42 is used by the user to twist a thread loop in making a dubbed body as will be subsequently described.

A fixture 44 is mounted to the end of the base 12 opposite to that where assembly 14 is located. Fixture 44 provides means for gripping an end of the thread upon which the dubbing material is to be placed and for holding the loop of thread stretched between this gripping fixture 44 and the hook 36 mounted to the spindle 34 when the loop is twisted to form a dubbed thread.

As shown in FIG. 3 the fixture 44 includes a post 46 having a threaded bore, which is inserted in bore 47 formed in the base 12 as shown in FIG. 3. The post 46 has a head portion 50. A spacer 52 having a central bore is mounted on post 46 as shown in FIG. 3. A cup washer 54 is mounted on post 46 immediately below spacer 52. A disc washer 56 is mounted on post 46 below cup washer 54 and another cup washer 58 is mounted below disc washer 56. A third cup washer 60 is mounted on post 46 below the base 12 as shown in FIG. 3. A machine screw 62 is threaded into threaded bore 48 of post 46. A spring 64 is mounted in surrounding relation with post 46 as shown in FIG. 3 and is secured in place by the head of machine screw 62. The spring 64 acts to resiliently clamp the spacer 52, the cup washer 54, the disc washer 56 and cup washer 58 to the base 12.

In a preferred embodiment a roughened strip of material 66 is affixed to the top surface of base 12 as shown in FIGS. 1 and 2. This strip helps to hold the dubbing material in place when it is laid on the thread on the base 12 and to cause the dubbed thread to be fuzzier than would be the case if the top of the base 12 were smooth.

To use this tool, a user takes a length of fly tying thread and loops the length over the hook 36 as shown in FIG. 1. A free end of the thread is then pulled through the gripping fixture 44 as shown in FIG. 1. If no taper is desired then the free end would be pulled between the cup washer 54 and disc washer 56. If a taper is desired then the free end would be pulled between the cup washer 58 and the base 12. The other free end of the thread is then pulled between spacer 22 and cup washer 21 to hold the thread taut as shown in FIG. 1. Next dubbing material (not shown) would be laid over the single thread lying on the strip 66. Once this is done the free end of the thread which was pulled between spacer 22 and cup washer 21 is withdrawn therefrom and the thread is laid over the dubbing material. This free end of the thread is then pulled through the gripping fixture 44 between disc washer 56 and cup washer 54 as shown in FIG. 2, if no taper is desired. If a taper is desired then this thread is pulled between the cup washer 58 and base 12. The spring 64 of the gripping fixture 44 functions to resiliently grip the free ends of the thread and hold the thread stretched between the hook 36 and the gripping fixture 44.

The user then turns the cylinder 42 of handle 38 with a thumb and forefinger to twist the thread loop.

In this manner a dubbed thread can be easily formed. The taper of the dubbed thread can be selected by selecting the postion of the free ends of the thread loop which are to be held by the gripping fixture 44. With the free ends of the thread between cup washer 58 and base 12 a taper is formed. With the free ends of the thread between cup washer 54 and disc washer 56, no taper is formed. Once the dubbed thread is formed, the wire spindle 34 can be removed from the notch 32. The free ends of the thread loop can be removed from the gripping fixture 44 and the handle 38 can be used as a tool for wrapping the dubbed thread on the hook of the fly being tied.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claims.

I claim:

1. A device for making dubbed thread used in fly tying wherein dubbing material is positioned on a length of thread and the thread is drawn over the dubbing material to form a loop of thread with the dubbing material sandwiched in the loop and wherein the loop of thread is twisted to form a dubbed thread, the device comprising:
    an elongate base;
    a thread twisting means having a first portion for holding an end of the loop of thread and further having means for twisting the loop of thread;
    a gripping means for gripping a length of thread;
    a first means located at one end of the elongate base for holding the thread twisting means and to which the gripping means is secured;
    a second means located at the other end of the elongate base to that held by the thread twisting means for resiliently gripping the free ends of the thread forming the loop whereby the loop of thread may be stretched between the first and second means.

2. The device according to claim 1 wherein the first means includes means for releasably holding the thread twisting means;

3. The device according to claim 1 wherein the second means includes multiple gripping means located one above the other, each gripping means adapted to grip an end of the loop of thread whereby the distance of the loop of thread above the base at the location of the second means may be selected by the selection of a particular gripping means for gripping the thread.

4. The device according to claim 1 wherein the top surface of the elongate base is roughened to hold the dubbing material when it is laid on the base over a length of thread.

5. The device according to claim 1 wherein the means for twisting the loop of thread includes a cylindrical element which is rotated on its longitudinal axis to twist the loop of thread.

* * * * *